Patented Feb. 26, 1929.

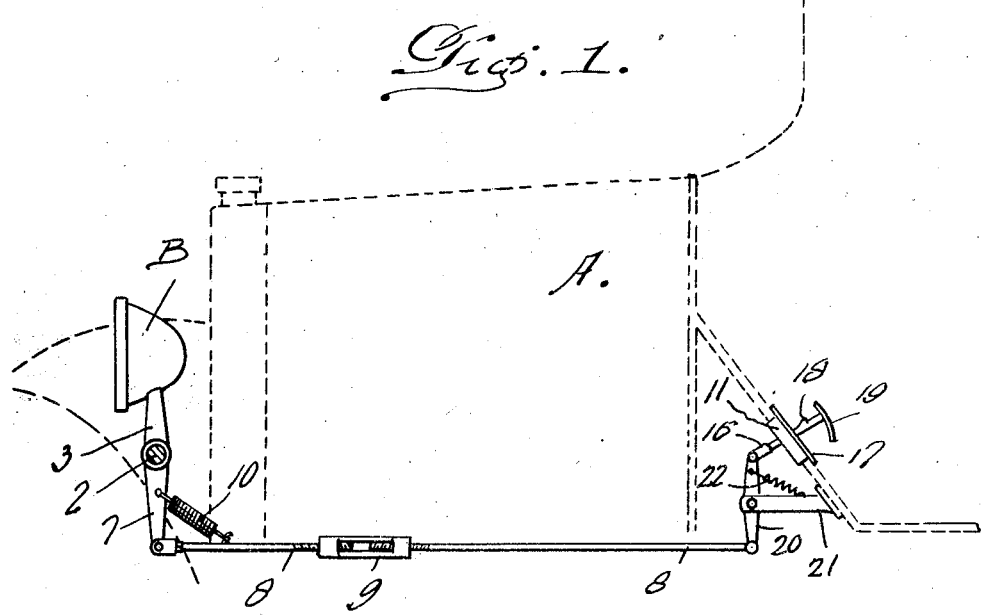
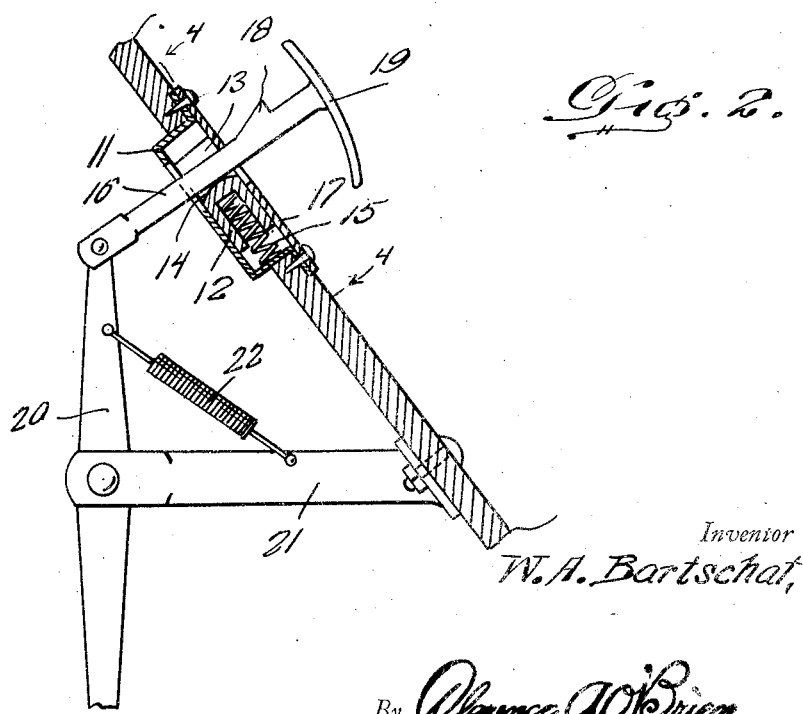

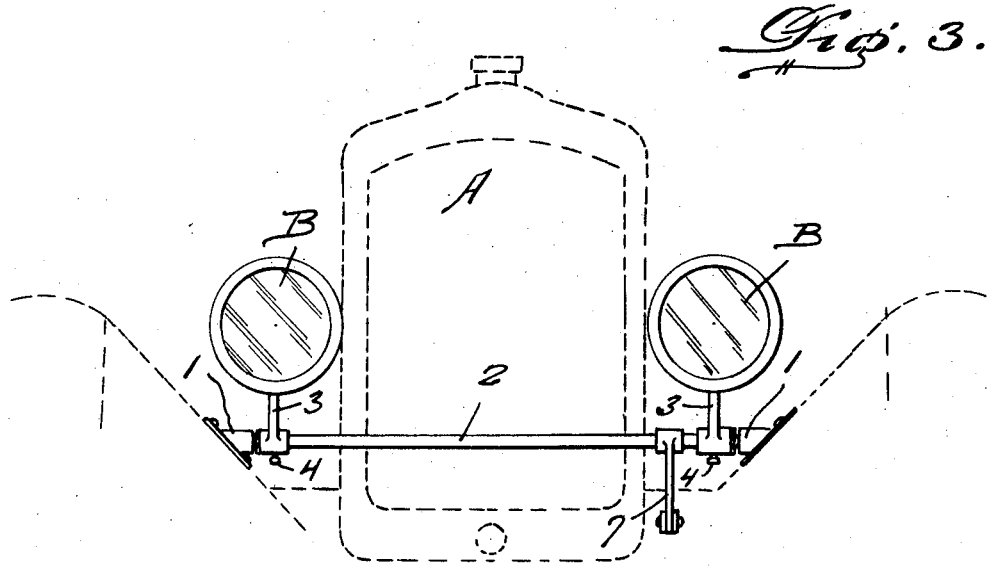
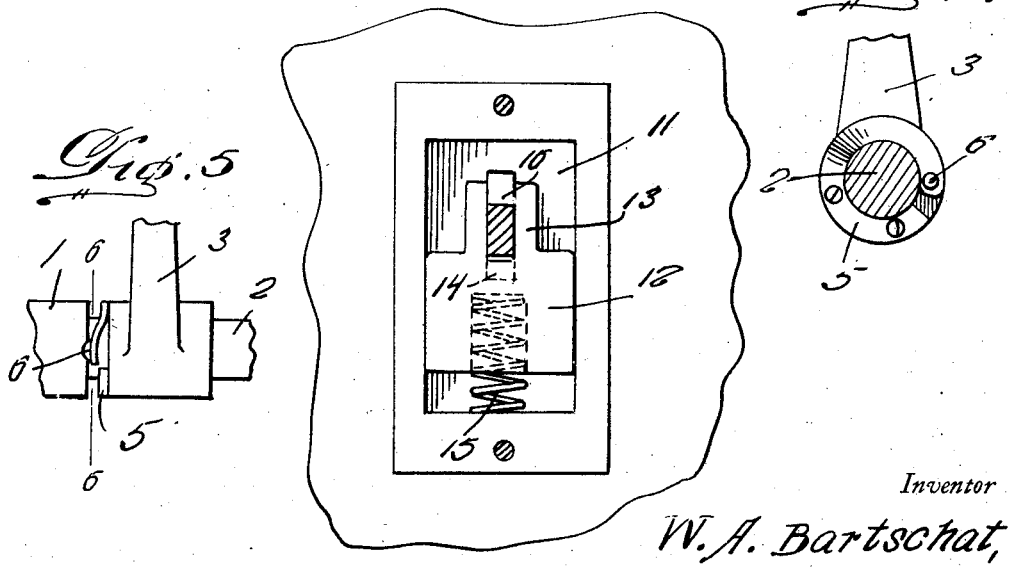

1,703,256

UNITED STATES PATENT OFFICE.

WILLIAM A. BARTSCHAT, OF TOMAHAWK, WISCONSIN, ASSIGNOR OF ONE-HALF TO AUGUST KARL BARTSCHAT, OF TOMAHAWK, WISCONSIN.

AUTOMOBILE HEADLIGHT CONTROL.

Application filed September 13, 1927. Serial No. 219,276.

My invention relates to improvements in automobile headlight controls, wherein the same has a more particular reference to a headlight control operated by the driver of the automobile for tilting the headlight in passing approaching automobiles.

I am conscious of the fact that there are a number of these devices for controlling the headlights of automobiles, but for one reason or another, practically all of these devices are more or less impractical in actual use. The defect in many of the cases is that no means is provided for retaining the lights in the position desired, that is when they are tilted. In addition, provision is often absent for rigidly maintaining the light in normal position. The main purpose of my invention is to remedy these defects and to provide such a headlight control which will be practical in every respect.

An object of my invention is to provide means associated with my headlight control that will maintain the headlight in operated position.

Another object resides in certain means I have provided associated with the foot lever control for normally maintaining the headlight in a rigid position against any wabbling or rattling.

Still another object resides in the fact that when the headlights are released from operated position, they will quickly and automatically return to their normal position.

A further object resides in the novel latch means associated with the foot lever for locking said light in tilted position while passing an approaching motorist.

Other objects and advantages of my headlight control will become more apparent as the same is further understood from the specification and claims to follow.

In the drawing:

Figure 1 is a side elevation of the working parts of my improved headlight control.

Figure 2 is a partial view of my headlight control showing the foot lever, and a partial sectional view of the floorboards of the automobile, showing in section my novel latch means associated with the foot lever.

Figure 3 is a front elevation of a conventional automobile showing certain advantages of my invention.

Figure 4 is an elevation showing a portion of the automobile floor boards, showing my novel latch means arranged therein in respect to the foot lever.

Figure 5 shows the spring means associated with the headlight cross bar for maintaining the headlight in a normal position.

Figure 6 is a fragmentary view of the headlight post showing my novel spring means associated therewith.

For a more detailed explanation of my headlight control, I now refer to the drawings in which like numerals designate like parts. For the purpose of more readily describing the application of my headlight control for an automobile I represent the automobile body A with the usual fenders and floor boarding in dotted lines. Bracket members 1 provided with the usual diagonal attaching plates are adapted to be secured to the fenders in the usual manner. Journaled into the brackets 1 are the end portions of a cross bar 2. Secured to this cross bar are a pair of upstanding headlight posts 3. These headlight posts may be formed with an opening in the lower ends thereof through which the cross bar 2 extends, and a set screw 4 may be threaded through this portion of the post to tightly engage the cross bar. To one side of these post members, I secure an annular split spring 5, the free end of said spring being curved outwardly and provided with a stud member 6. This stud is adapted for engagement in a suitable recess or opening in the end of the bracket 1.

Keyed to the cross bar 2 is a depending arm 7, to the free end of which is pivotally connected a connecting rod 8. This connecting rod may be provided with a suitable adjusting means, such as the turnbuckle 9. Connected between the depending arm 7 and the connecting rod 8 is a coiled spring 10.

The usual floor boarding of the automobile as is shown in Figure 2 of the drawing, is formed with a rectangular shaped opening in which is disposed and adapted to be secured a shallow metal box 11 formed with an elongated opening in the bottom thereof. A plate 12 is formed with an opening extending inwardly from one end thereof, and provided at its opposite end with a pair of spaced projections 13. The portion of the plate between the projections 13 as is indicated at 14 is preferably arcuate. The coiled spring 15 having one end thereof seated in the opening in the plate 12 is adapted to have its opposite end portion disposed against the end wall of the box 11.

Between the projections 13 the foot lever 16 is adapted to operate. The slide plate 12 being normally spring projected engages the foot lever 16. The cover 17 for the box 11 is formed with an opening through which the lever is adapted to move. Located on the upper side of the foot lever is an inclined formation 18, said formation also being formed with a shoulder. The foot lever is provided with the usual foot plate 19 secured to one end thereof, while the opposite end of the foot lever engages a rocker arm 20. A suitable bracket 21 secured to the under side of the floor board by a suitable means, is adapted at its outer end to have the rocker arm 20 pivoted thereto, said rocker arm being pivoted approximately intermediately. The lower extremity of the rocker arm 20 is adapted for pivotal connection with the connecting rod 8. Connecting the upper part of the rocker arm 20 with the bracket 21 is a coiled spring 22, adapted to normally maintain the formation 18 on the foot lever a substantial distance above the cover 17.

In operation, when it is desired to tilt the headlight, the foot lever 16 is depressed by the driver of the vehicle. After the lever 16 is forced through the box 11 the inclined formation 18 will ride against the edge of the opening in the cover 17. At the same time the slide plate 12 will be moved within the box 11 against the tension of the spring 15. As the lever 16 is forced through the box, and the formation 18 has passed through the cover 17, the spring projected slide plate 12 will then force the foot lever 16 upwardly causing the shoulder of the formation 18 to bear against the under side of the cover 17.

When the foot lever is in this position the rocker arm 20 has been moved accordingly, causing a rearward pull to the connecting rod 8. This movement of the connecting rod through the depending lever 7, causes the oscillation of the cross bar 2. In the movement of the cross bar 2 the curved stud members 6 carried by the spring 5 secured onto one side of the lamp post, disengages from the recesses on the brackets 1 thus causing the head lights C to be tilted. This movement of the headlights is completed against the tension of the coiled spring 10 and 22 respectively. So long as the shoulder of the formation 18 remains in contact with the under side of the cover 17, the headlights C will be maintained in tilted position. However, when a downward push by the operator is given to the foot plate 19, the formation 18 will become disengaged from the underside of the cover 17 and the headlights will be automatically returned to their normal position due to the retractile movement of the springs 22 and 10 respectively.

In a normal position the split annular springs 5 are adapted to maintain the curved stud 6 in tensioned relation within the opening formed in the ends of the respective brackets 1.

Having thus described my invention, what I claim as new is:—

1. In a headlight control for automobiles comprising a cross bar, a post for supporting a headlight secured to said bar, a connecting rod for operating said cross bar, an operating lever for actuating said connecting rod, a spring projected tension plates, a pair of spaced guide projections on said plate between which the lever is adapted to operate, a cover for said latch plate, and said lever being formed with a shoulder thereon adapted to engage under said cover, and means on said cross bar for maintaining said lamp post in a normal non-tilted position.

2. In a headlight control for automobiles comprising a rotatable cross bar mounted at the front of the automobile, journal members on the automobile, adapted to receive the ends of said bar, a lamp standard projecting from said bar, means for rotating said bar, and complementary means between the said lamp standard and the journal members for maintaining the bars against accidental rotation, said means consisting of a split annular leaf spring arranged around the bar and having one end secured to the lamp standard, the opposite end of the spring being sprung outwardly and adapted to be seated in a recess formed in one of the journal members when the lamp standard is moved to its normal vertical position.

3. In a headlight control for automobiles comprising, a closed casing secured within the automobile and having registering openings through opposing side walls thereof, a lever adapted for engagement through said openings and being provided with a lug thereon engageable within the casing, a slide plate operable within the casing, tensional means for urging the plate against the lever, connecting means between the lever and the headlight whereby the headlight may be adjusted by the movement of the lever, said plate being adapted to tensionally bear against the lever so that the lever may be retained in a depressed position.

In testimony whereof I affix my signature.

WILLIAM A. BARTSCHAT.